US012420546B2

(12) United States Patent
Sawada

(10) Patent No.: US 12,420,546 B2
(45) Date of Patent: Sep. 23, 2025

(54) IMAGE FORMATION APPARATUS AND METHOD OF FORMING AN IMAGE

(71) Applicant: SCREEN HOLDINGS CO., LTD., Kyoto (JP)

(72) Inventor: Kazuna Sawada, Kyoto (JP)

(73) Assignee: SCREEN Holdings Co., Ltd., Kyoto (JP)

(*) Notice: Subject to any disclaimer, the term of this patent is extended or adjusted under 35 U.S.C. 154(b) by 0 days.

(21) Appl. No.: 18/274,333

(22) PCT Filed: Nov. 24, 2021

(86) PCT No.: PCT/JP2021/043024
§ 371 (c)(1),
(2) Date: Jul. 26, 2023

(87) PCT Pub. No.: WO2022/163096
PCT Pub. Date: Aug. 4, 2022

(65) Prior Publication Data

US 2025/0144946 A1 May 8, 2025

(30) Foreign Application Priority Data

Jan. 29, 2021 (JP) ................................ 2021-013089

(51) Int. Cl.
*B41J 2/045* (2006.01)
*B41J 2/21* (2006.01)
(Continued)

(52) U.S. Cl.
CPC ......... *B41J 2/04505* (2013.01); *B41J 2/2103* (2013.01); *B41J 11/008* (2013.01);
(Continued)

(58) Field of Classification Search
CPC .... B41J 2/04505; B41J 2/2103; B41J 11/008; B41J 11/42; B41J 2/2135; B41J 2/2146;
(Continued)

(56) References Cited

U.S. PATENT DOCUMENTS 9,213,287 B1 12/2015 Armbruster et al.
2018/0022119 A1 1/2018 Kamigiku et al.
(Continued)

FOREIGN PATENT DOCUMENTS

CN 116100957 A * 5/2023 .......... B41J 2/04553
DE 10 2019 208 257 A1 1/2020
(Continued)

OTHER PUBLICATIONS

International Search Report issued in corresponding International Patent Application No. PCT/JP2021/043024, dated Jan. 11, 2022, with English translation.
(Continued)

*Primary Examiner* — Justin Seo
(74) *Attorney, Agent, or Firm* — Rimon P.C.

(57) ABSTRACT

A technique for predicting the amount of misregistration accurately in a short time is provided. A measurement part acquires measurement data for each of a plurality of measurement items about a state of printing paper. A first reasoner infers the amount of misregistration between a first image formed by an ejection head and a second image formed by an ejection head, based on the measurement data on the plurality of measurement items. A second reasoner selects some measurement items from the plurality of measurement items, based on a contribution of each measurement item to the amount of misregistration inferred by the first reasoner. The second reasoner infers the amount of misregistration using the measurement data on the selected measurement items.

5 Claims, 5 Drawing Sheets

(51) Int. Cl.
*B41J 11/00* (2006.01)
*B41J 11/42* (2006.01)

(52) U.S. Cl.
CPC .............. *B41J 11/42* (2013.01); *B41J 2/2135* (2013.01); *B41J 2/2146* (2013.01)

(58) Field of Classification Search
CPC ... B41J 11/46; B41J 11/0095; B65H 23/1806; B65H 2553/412; B65H 2553/416; B65H 2553/51; B65H 2801/15
See application file for complete search history.

(56) References Cited

U.S. PATENT DOCUMENTS

| | | | |
|---|---|---|---|
| 2020/0094590 | A1 | 3/2020 | Yoshida et al. |
| 2020/0307279 | A1 | 10/2020 | Yoshida |

FOREIGN PATENT DOCUMENTS

| | | | |
|---|---|---|---|
| JP | 2018-016412 | A | 2/2018 |
| JP | 2020-045234 | A | 3/2020 |
| JP | 2020-164321 | A | 10/2020 |

OTHER PUBLICATIONS

Extended European Search Report dated Nov. 26, 2024 of the corresponding European Patent Application No. 21923101.6.

* cited by examiner

IMAGE FORMATION APPARATUS AND METHOD OF FORMING AN IMAGE

CROSS REFERENCE TO RELATED APPLICATIONS

This application is the U.S. National Phase under 35 U.S.C. § 371 of International Patent Application No. PCT/JP2021/043024, filed on Nov. 24, 2021, which claims the benefits of Japanese Patent Application No. 2021-013089, filed on Jan. 29, 2021 the entire contents of which are hereby incorporated by reference.

TECHNICAL FIELD

The present invention relates to an image formation apparatus and an image formation method.

BACKGROUND ART

An inkjet printing apparatus for printing an image on an elongated strip-shaped base material by ejecting ink from a plurality of heads while transporting the base material in a longitudinal direction thereof has been known. The inkjet printing apparatus ejects inks of different colors from the respective heads. Then, the inkjet printing apparatus prints a multi-color image on a surface of the base material by superimposing single-color images formed by the respective inks of different colors. Such a conventional printing apparatus is disclosed, for example, in Patent Literature 1.

CITATION LIST

Patent Literature

Patent Literature 1: Japanese Patent Application Laid-Open No. 2018-016412

SUMMARY OF INVENTION

Technical Problem

In conventional printing apparatuses, there are cases in which slight misalignment (what is called "misregistration") occurs between single-color images of respective color inks. The misregistration is caused by various factors such as rotation errors of rollers for transporting a base material and the expansion/contraction of the base material. To prevent this, it is conceivable to predict the amount of misregistration from measurement data outputted from a plurality of sensors and correct the ejection timing of each color ink so as to cancel out the predicted amount of misregistration.

In general, the greater the number of measurement items is, the more accurately the amount of misregistration can be predicted. However, the amount of computation increases as the number of measurement items increases, so that it takes longer to predict the amount of misregistration. As a result, it has been sometimes difficult to cancel out the amount of misregistration because the correction of the ejection timing cannot be made in time. Thus, there is a need for a technique for predicting the amount of misregistration accurately in a short time.

It is therefore an object of the present invention to provide a technique for predicting the amount of misregistration accurately in a short time.

Solution to Problem

To solve the aforementioned problem, a first aspect is intended for an image formation apparatus comprising: a transport mechanism for transporting an elongated strip-shaped base material along a predetermined transport path in a longitudinal direction of the base material; a first ejection part for ejecting a first ink toward the base material being transported by the transport mechanism; a second ejection part positioned downstream from the first ejection part and for ejecting a second ink toward the base material being transported by the transport mechanism; a measurement part for acquiring measurement data for each of a plurality of measurement items about a state of the base material; a first reasoner for inferring the amount of misregistration between a first image formed by the first ejection part and a second image formed by the second ejection part, based on the measurement data on the plurality of measurement items; and a second reasoner for selecting some measurement items from the plurality of measurement items, based on a contribution of each measurement item to the amount of misregistration inferred by the first reasoner, and for inferring the amount of misregistration using the measurement data on the selected measurement items.

A second aspect is intended for the image formation apparatus of the first aspect, wherein the second reasoner selects some measurement items from the plurality of measurement items so that an error between the amount of misregistration inferred by the first reasoner and the amount of misregistration inferred by the second reasoner is not greater than a predetermined threshold value.

A third aspect is intended for the image formation apparatus of the first or second aspect, wherein the second reasoner selects some measurement items from the plurality of measurement items again in accordance with a variation in the contribution to infer the amount of misregistration using the measurement data on the measurement items selected again.

A fourth aspect is intended for the image formation apparatus of any one of the first to third aspects, which further comprises an ejection controller for controlling the ejection of the ink from the second ejection part, based on the amount of misregistration inferred by the second reasoner.

A fifth aspect is intended for a method of forming an image comprising the steps of: a) transporting an elongated strip-shaped base material along a predetermined transport path in a longitudinal direction of the base material; b) ejecting a first ink toward the base material being transported according to the step a); c) ejecting a second ink toward the base material being transported according to the step a) downstream from a position in which the first ink is ejected according to the step b); d) acquiring measurement data for each of a plurality of measurement items about a state of the base material; e) inferring the amount of misregistration between a first image formed on the base material according to the step b) and a second image formed on the base material according to the step c), based on the measurement data on the plurality of measurement items; f) selecting some measurement items from the plurality of measurement items, based on a contribution of each measurement item to the amount of misregistration inferred according to the step e); and g) inferring the amount of misregistration using the measurement data on the measurement items selected according to the step f).

Advantageous Effects of Invention

In the image formation apparatus of the first to fourth aspects, some measurement items are selected based on the contribution of each measurement item obtained in the case where the amount of misregistration is inferred using the plurality of measurement items. Thus, the amount of misregistration is accurately inferred even using the measurement data on the selected measurement items. Also, the inference of the amount of misregistration using the selected measurement items makes the amount of computation smaller than the inference of the amount of misregistration using the plurality of measurement items. This allows the prediction of the amount of misregistration in a short time.

In the image formation apparatus of the second aspect, some measurement items are selected from the plurality of measurement items so that an error between the amount of misregistration inferred using the plurality of measurement items and the amount of misregistration inferred using the selected measurement items is not greater than a predetermined threshold value. Thus, the amount of misregistration is accurately inferred even using the selected measurement items.

In the image formation apparatus of the third aspect, some measurement items are selected again from the plurality of measurement items when the contribution of each measurement item has varied. Thus, the amount of misregistration is accurately inferred based on the measurement items selected again even when the contribution of each measurement item has varied.

In the image formation apparatus of the fourth aspect, the ejection of the second ink from the second ejection part is controlled based on the amount of misregistration, whereby the occurrence of misregistration between the images formed by the first and second ejection parts is suppressed.

In the image formation method of the fifth aspect, some measurement items are selected based on the contribution of each measurement item obtained in the case where the amount of misregistration is inferred using the plurality of measurement items. Thus, the amount of misregistration is accurately inferred even using the measurement data on the selected measurement items. Also, the inference of the amount of misregistration using the selected measurement items makes the amount of computation smaller than the inference of the amount of misregistration using the plurality of measurement items. This allows the prediction of the amount of misregistration in a short time.

DESCRIPTION OF EMBODIMENTS

Figure 1:
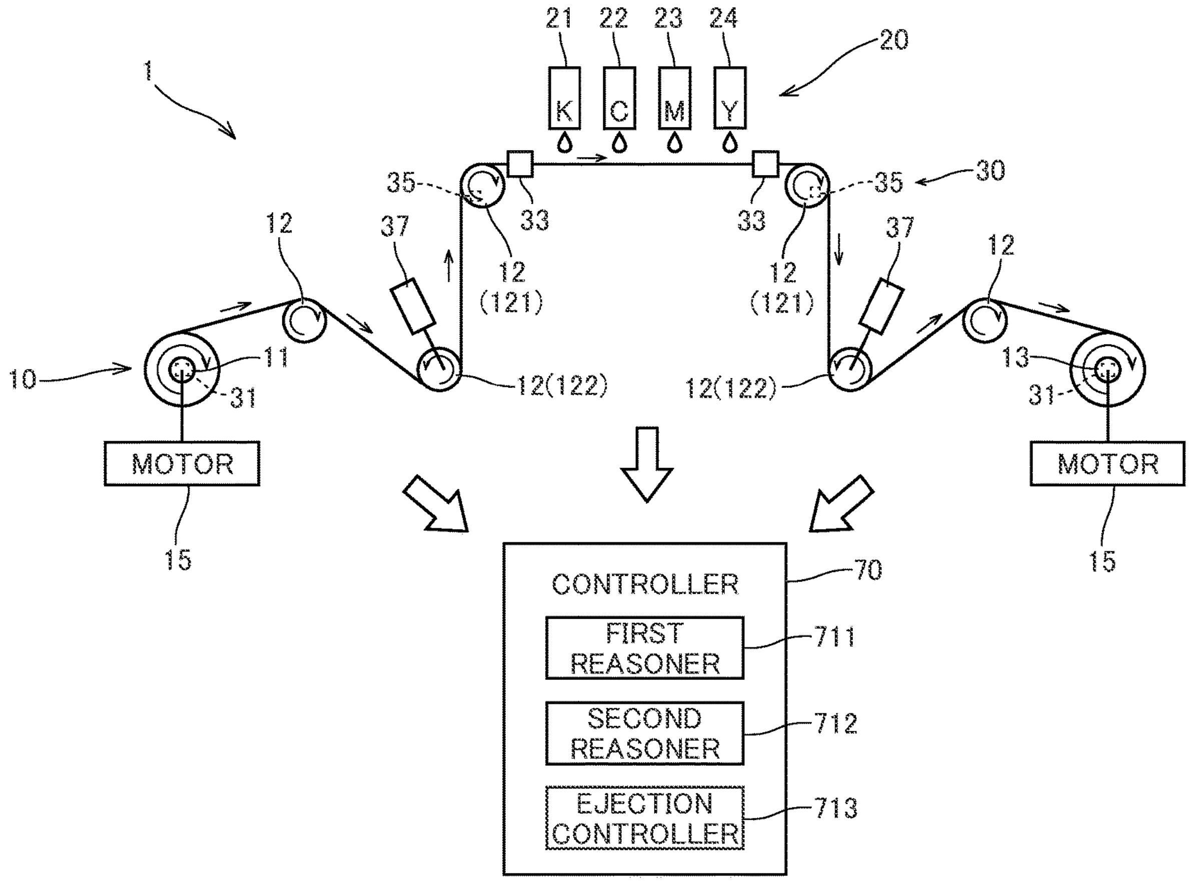
FIG. 1 is a diagram showing a configuration of an image formation apparatus.

An embodiment according to the present invention will now be described with reference to the drawings. Components described in the embodiment are merely illustrative, and there is no intention to limit the scope of the present invention thereto. In the drawings, the dimensions of components and the number of components are shown in exaggeration or in simplified form, as appropriate, for the sake of easier understanding in some cases.

1. Embodiment

FIG. 1 is a diagram showing a configuration of an image formation apparatus 1. The image formation apparatus 1 is an inkjet printing apparatus for recording an image on printing paper 9 that is an elongated strip-shaped base material by ejecting inks from a plurality of ejection heads 21 to 24 toward the printing paper 9 while transporting the printing paper 9. The base material is not limited to the printing paper 9, but may be, for example, a resin film, metal foil, or a base material made of glass. As shown in FIG. 1, the image formation apparatus 1 includes a transport mechanism 10, an image recording part 20, a measurement part 30, and a controller 70.

The transport mechanism 10 transports the printing paper 9 in a predetermined transport direction. The transport direction is parallel to a longitudinal direction of the printing paper 9. The transport mechanism 10 includes an unwinding roller 11, a plurality of transport rollers 12, and a winding roller 13. The printing paper 9 is unwound from the unwinding roller 11, and is transported along a transport path formed by the transport rollers 12. Each of the transport rollers 12 rotates about a rotary shaft to thereby guide the printing paper 9 downstream along the transport path. The transported printing paper 9 is collected on the winding roller 13.

A motor 15 is connected to the rotary shaft of each of the unwinding roller 11 and the winding roller 13. The motors 15 are electrically connected to the controller 70. The motors 15 rotate the unwinding roller 11 and the winding roller 13 at a predetermined rotation speed, based on control signals transmitted from the controller 70. This causes the printing paper 9 to be transported at a predetermined transport speed along the transport path. The motors 15 may be connected to any of the transport rollers 12.

As shown in FIG. 1, the printing paper 9 moves under the ejection heads 21 to 24 substantially in parallel with a direction in which the ejection heads 21 to 24 are arranged. At this time, a recording surface of the printing paper 9 faces upwardly (toward the ejection heads 21 to 24). The printing paper 9 runs over the transport rollers 12 while being held under tension. This prevents slack and wrinkles in the printing paper 9 during the transport.

The image recording part 20 is a processing part for ejecting droplets of inks (ink droplets) toward the printing paper 9 being transported by the transport mechanism 10. The image recording part 20 of the present embodiment includes the four ejection heads 21 to 24 (ejection parts). The ejection heads 21 to 24 are arranged along the transport path of the printing paper 9.

Figure 2:
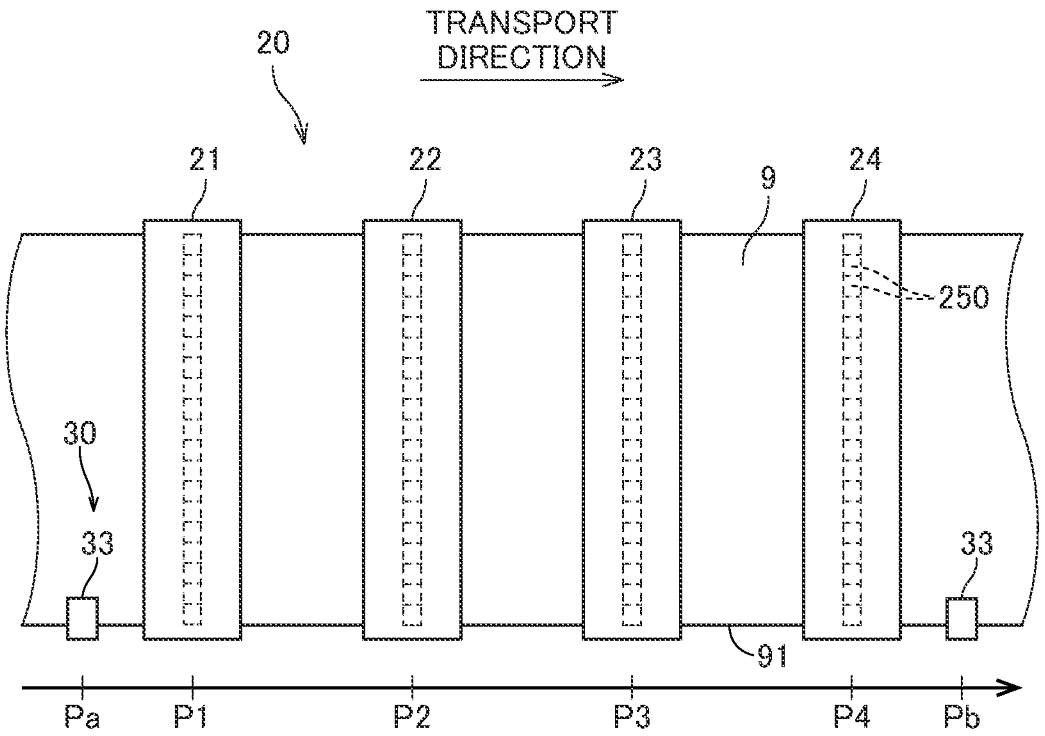
FIG. 2 is a partial top view of the image formation apparatus in the vicinity of an image recording part.

FIG. 2 is a partial top view of the image formation apparatus 1 in the vicinity of the image recording part 20. Each of the ejection heads 21 to 24 covers the entire width of the printing paper 9. As indicated by broken lines in FIG. 2, each of the ejection heads 21 to 24 has a lower surface provided with a plurality of nozzles 250 arranged parallel to the width direction of the printing paper 9. The ejection heads 21, 22, 23, and 24 eject ink droplets of respective colors, i.e., K (black), C (cyan), M (magenta), and Y (yellow) which serve as color components of a multi-color image from the nozzles 250 toward an upper surface of the printing paper 9.

The ejection head 21 ejects K-color ink droplets toward the upper surface of the printing paper 9 in an ejection position P1 lying on the transport path. The ejection head 22 ejects C-color ink droplets toward the upper surface of the printing paper 9 in an ejection position P2 downstream from the ejection position P1. The ejection head 23 ejects M-color ink droplets toward the upper surface of the printing paper 9 in an ejection position P3 downstream from the ejection position P2. The ejection head 24 ejects Y-color ink droplets toward the upper surface of the printing paper 9 in an ejection position P4 downstream from the ejection position P3. The ejection positions P1 to P4 are equally spaced along the transport direction of the printing paper 9.

Each of the four ejection heads 21 to 24 ejects ink droplets to thereby record a single-color image on the upper surface of the printing paper 9. A multi-color image is formed on the upper surface of the printing paper 9 by superimposing the four single-color images. If the ink droplets ejected from the four ejection heads 21 to 24 are out of position relative to each other as seen in the transport direction on the printing paper 9, the image quality of a printed product is lowered. Thus, the print quality of the image formation apparatus 1 is improved by controlling the error in position of the single-color images on the printing paper 9 (referred to hereinafter as "the amount of misregistration") within an allowable range.

The image formation apparatus 1 may further include a drying processing part for drying the inks ejected onto the recording surface of the printing paper 9. The drying processing part is provided, for example, downstream from the ejection heads 21 to 24 as seen in the transport direction. The drying processing part, for example, blows a heated gas toward the printing paper 9 to vaporize a solvent contained in the inks adhering to the printing paper 9, thereby drying the inks. The drying processing part may be of the type which dries the inks by other methods such as heating using a heat roller and irradiation with light.

The measurement part 30 measures a plurality of measurement items that represent the state of the printing paper 9 to thereby acquire measurement data on each of the measurement items. The measurement part 30 specifically includes two torque detection parts 31, two edge position detection parts 33, two encoders 35, and two tension detection parts 37.

The unwinding roller 11 and the winding roller 13 are mounted with the respective torque detection parts 31. The torque detection parts 31 detect the torque of the rotary shafts of the unwinding roller 11 and the winding roller 13. The torque detection parts 31 send a detection signal indicating the detected torque to the controller 70. It is not essential to detect the torque of both the unwinding roller 11 and the winding roller 13. The torque of only one of the unwinding roller 11 and the winding roller 13 may be detected. The torque of any one of the transport rollers 12 may be detected. The torque detected by the torque detection parts 31 is a measurement item indicating the transport state of the printing paper 9.

The two edge position detection parts 33 detect the widthwise position of an edge (widthwise edge) 91 of the printing paper 9. The edge position detection parts 33 detect the edge 91 of the printing paper 9 in a detection position Pa upstream from the ejection position P1 on the transport path and in a detection position Pb downstream from the ejection position P4 on the transport path. The edge position detection parts 33 may detect the edge position of the printing paper 9 in a position different from the detection positions Pa and Pb. The position of the edge 91 detected by the edge position detection parts 33 is a measurement item indicating the transport state of the printing paper 9.

Each of the edge position detection parts 33 includes, for example, a light emitter positioned over the edge 91 of the printing paper 9, and a line sensor positioned under the edge 91. The light emitter emits parallel light beams downwardly. The line sensor includes a plurality of light receiving elements arranged in the width direction. Outside the edge 91 of the printing paper 9, light beams emitted from the light emitter enter the light receiving elements. Inside the edge 91 of the printing paper 9, on the other hand, light beams emitted from the light emitter do not enter the light receiving elements because the light beams emitted from the light emitter are intercepted by the printing paper 9. The edge position detection parts 33 detect the widthwise position of the edge 91 of the printing paper 9, based on whether light beams are detected by the light receiving elements or not.

The two edge position detection parts 33 intermittently detect the position of the edge 91 of the printing paper 9 in the detection positions Pa and Pb. Then, the edge position detection parts 33 send a detection signal indicating the position of the edge 91 to the controller 70. The edge position detection parts 33 may continuously detect the position of the edge 91. It is not essential that the image formation apparatus 1 includes the two edge position detection parts 33, but the image formation apparatus 1 may include one or not less than three edge position detection parts 33.

Two transport rollers 12 (transport rollers 121 in FIG. 1) selected from among the plurality of the transport rollers 12 are provided with the two respective encoders 35. The encoders 35 detect the rotation of the respective transport rollers 121 to send a continuous pulse signal synchronized with the rotation of the respective transport rollers 121 to the controller 70. The continuous pulse signal is measurement data that reflects changes over time in the transport speed of the printing paper 9 being transported by the transport rollers 12 including the transport rollers 121. It is not essential that the image formation apparatus 1 includes the two encoders 35, but the image formation apparatus 1 may include one or not less than three encoders 35.

The two tension detection parts 37 are mounted to two respective transport rollers 12 (transport rollers 122 in FIG. 1) selected from among the plurality of the transport rollers 12. The tension detection parts 37 measure the force received from the printing paper 9 at the transport rollers 122. The tension detection parts 37 detect the tension applied to the printing paper 9 to output a detection signal indicating the detected tension to the controller 70. The tension of the printing paper 9 is a measurement item representing the transport state of the printing paper 9. It is not essential that the tension of the two transport rollers 12 is detected. The tension of one or not less than three transport rollers 12 may be detected.

Figure 3:
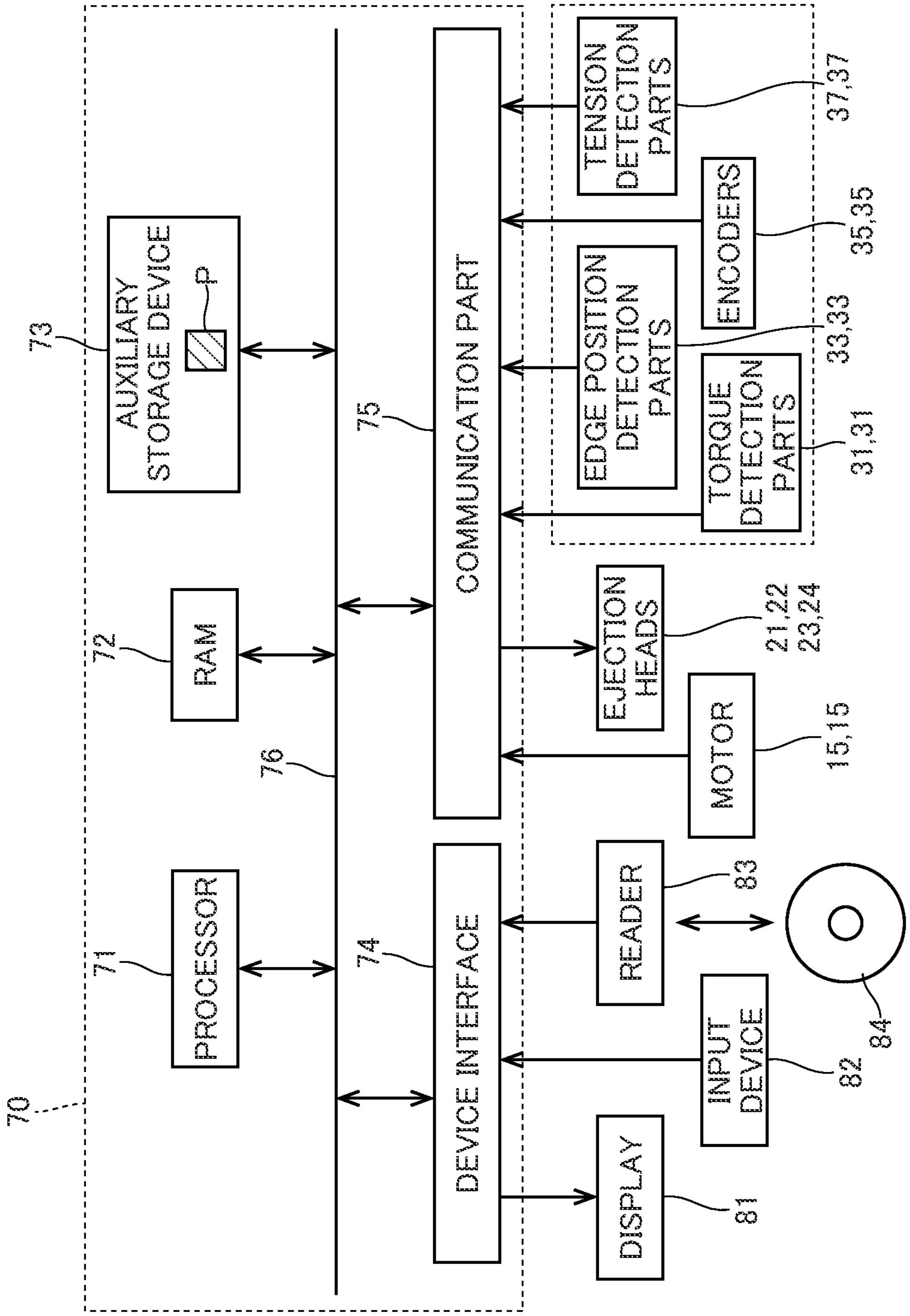
FIG. 3 is a block diagram showing a hardware configuration of a controller.

FIG. 3 is a block diagram showing a hardware configuration of the controller 70. The controller 70 controls the operations of the components in the image formation apparatus 1. The controller 70 includes a processor 71, a RAM 72, an auxiliary storage device 73, a device interface 74, and a communication part 75. The RAM 72, the auxiliary storage device 73, the device interface 74, and the communication part 75 are electrically connected to the processor 71 through a bus interconnect line 76.

The processor 71 includes, for example, a CPU or a GPU. The RAM 72 is a readable/writable memory, and stores various pieces of information to be processed by the processor 71 therein. The auxiliary storage device 73 is a non-transitory storage medium, such as a hard disk drive. The auxiliary storage device 73 stores a program P therein.

The device interface 74 is an intermediary device for mediating the exchanges of data between external devices (such as peripheral devices) and the controller 70. The controller 70 is electrically connected through the device interface 74 to a display 81, an input device 82, and a reader 83. The display 81 displays various pieces of information. The input device 82 includes a mouse or a keyboard. The controller 70 accepts user inputs via the input device 82. A touch panel may be used to constitute the display 81, thereby causing the display 81 to function as the input device 82. The reader 83 reads information recorded on a recording medium 84. The recording medium 84 is a non-transitory recording medium such as an optical disk, a magnetic disk, a magneto-optical disk, or a memory card, for example.

The controller 70 reads the program P from the recording medium 84 via the reader 83 in advance to store the program P in the auxiliary storage device 73. The controller 70 may acquire the program P via a network.

A user of the image formation apparatus 1 inputs information, for example, about the type or amounts of inks to be ejected from the ejection heads 21 to 24 of the image recording part 20, the type, shape, or thickness of the printing paper 9, and the like via the input device 82. The controller 70 stores the inputted information in the RAM 72 or the auxiliary storage device 73. The controller 70 may acquire information about various set values and conditions via its own sensor or other devices.

The communication part 75 is connected to the two motors 15 of the transport mechanism 10, the four ejection heads 21 to 24, and the measurement part 30 (the two torque detection parts 31, the two edge position detection parts 33, the two encoders 35, and the two tension detection parts 37) for wired or wireless communication.

The processor 71 temporarily stores the program P in the RAM 72, and performs computations based on the stored program P. The controller 70 controls the operations of the components in the image formation apparatus 1, whereby the transport of the printing paper 9 and the ejection of inks toward the printing paper 9 are performed. The prediction of the amount of misregistration in the transport direction of the printing paper 9 to be described later is performed.

The processor 71 operates based on the program P to thereby function as a first reasoner 711, a second reasoner 712, and an ejection controller 713 (with reference to FIG. 1). The first reasoner 711 and the second reasoner 712 predict (infer) the amount of misregistration, based on the measurement data acquired by the measurement part 30.

The first reasoner 711 and the second reasoner 712 have leaned models obtained by machine learning of a supervised learning algorithm. A leaned model is obtained by machine learning which infers the amount of misregistration from measurement data on the measurement items. Training data includes a set of measurement data for each measurement item acquired by the measurement part 30 and an actual measured value of the amount of misregistration. Examples of the algorithm usable herein for supervised learning include support vector machines, neural networks, linear models, and gradient boosting. In the supervised learning, while the input of measurement data to a target model and the output of the amount of misregistration from the model are repeated, parameters of the model are adjusted so that the amount of misregistration outputted from the model approaches the actual measured value. Finally, a learned model with adjusted parameters is generated.

The actual measured value of the amount of misregistration is acquired, for example, in a manner to be described below. First, in the image formation apparatus 1, the ejection heads 21 to 24 print respective predetermined marks on the printing paper 9 being transported by the transport mechanism 10. The amount of misregistration is determined by measuring the actual size of a misalignment of each of the marks printed on the printing paper 9. While each of the marks is being printed, the measurement part 30 collects measurement data on each measurement item. The set of the actual measured value of the amount of misregistration and the measurement data on each measurement item corresponding to the actual measured value obtained in this manner is used as the training data.

A learned model (a first learned model) of the first reasoner 711 is configured to output the amount of misregistration by using measurement data on all measurement items (all of the measurement items measured by the measurement part 30) as an input. Thus, a set of the measurement data on all measurement items (input) and the actual measured value of the amount of misregistration (output) is used as the training data in the machine learning for obtaining the learned model of the first reasoner 711. A learned model (a second learned model) of the second reasoner 712 is configured to output the amount of misregistration by using measurement data on some measurement items out of all measurement items as an input. Thus, a set of the measurement data on various combinations of the measurement items (input) and the actual measured value of the amount of misregistration (output) is used as the training data in the machine learning for obtaining the learned model of the second reasoner 712.

The ejection controller 713 controls the ejection of inks from the ejection heads 21 to 24. More specifically, the ejection controller 713 controls the ejection of inks from the ejection heads 21 to 24 so as to cancel out the amount of misregistration inferred by the second reasoner 712. For example, if the second reasoner 712 infers that misregistration occurs between the ejection heads 21 and 22, the ejection controller 713 shifts the ink ejection timing of the ejection head 22 relative to the ejection timing used when no misregistration is inferred. This prevents the occurrence of misregistration between images formed by the ejection heads 21 and 22.

The controller 70 may control the transport speed of the printing paper 9 by means of the transport mechanism 10 so as to cancel out the amount of misregistration inferred by the second reasoner 712. This allows portions of the printing paper 9 to be inked by the ejection heads 21 to 24 to pass through the ejection positions P1 to P4 at or near the ideal time. Thus, even if the ejection controller 713 does not correct the timing of ejection from the ejection heads 21 to 24 based on the amount of misregistration, the occurrence of misregistration between images formed by the ejection heads 21 to 24 is suppressed.

<Operation of First Reasoner>

Figure 4:
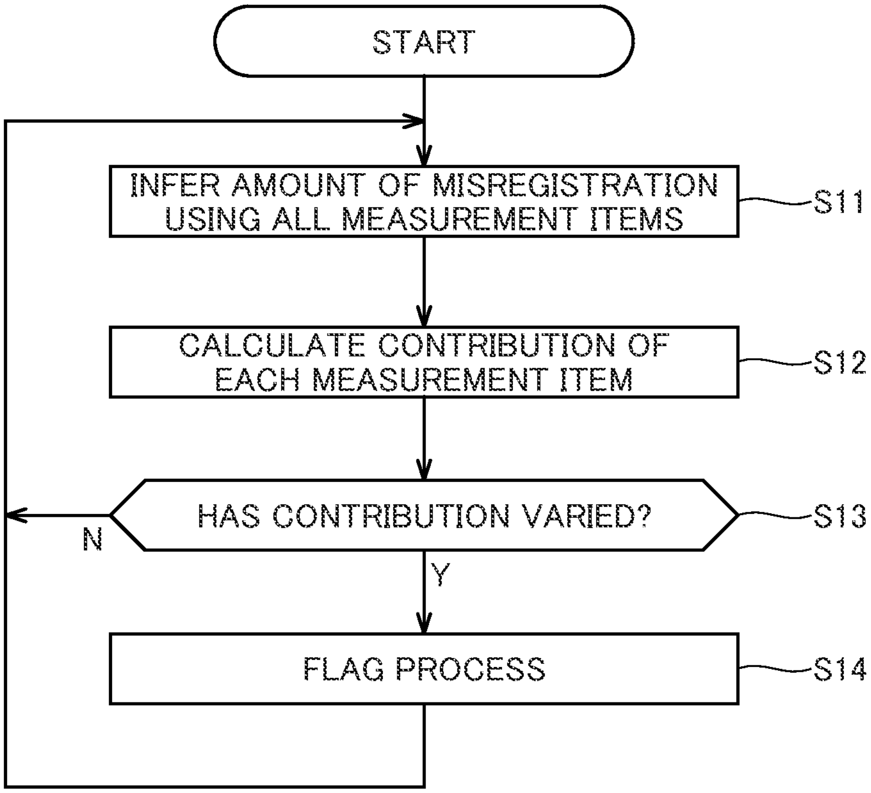
FIG. 4 is a diagram showing processes that a first reasoner executes.

FIG. 4 is a diagram showing processes that the first reasoner 711 executes. As shown in FIG. 4, the first reasoner 711 repeatedly executes an inference process S11 through a flag process S14 while printing is being performed in the image formation apparatus 1.

First, the first reasoner 711 uses all measurement data acquired by the measurement part 30 to infer the amount of misregistration (a first misregistration amount) (the inference process S11).

The first reasoner 711 also calculates a contribution of each measurement item to the outputted first misregistration amount (a contribution calculation process S12). The first reasoner 711 stores the calculated contribution of each measurement item in a storage part (the RAM 72 or the auxiliary storage device 73).

The contribution is a value indicating the weighting of each measurement item in the first learned model of the first reasoner 711 in calculating an estimate of the amount of misregistration from the measurement data on a plurality of measurement items. The contribution is calculated based on learned parameters of the first learned model. For example, SHAP (SHapley Additive explanations) values may be used for the contribution.

For each measurement item, the first reasoner 711 determines whether the contribution calculated according to the calculation process S12 has varied from the previously calculated contribution or not (a determination process S13). If the first reasoner 711 determines that the contribution of at least some measurement items out of all measurement items has varied according to the determination process S13, the first reasoner 711 sets a flag indicating that the contribution of each measurement item stored in the storage part has varied (the flag process S14). After setting the flag, the first reasoner 711 executes the inference process S11 again. On the other hand, if the first reasoner 711 determines that the contribution has not varied according to the determination process S13, the first reasoner 711 executes the inference process S11 again without executing the flag process S14.

As described above, the first reasoner 711 periodically performs the inference of the amount of misregistration (the first misregistration amount) using the measurement data on all measurement items, and the calculation of the contribution of each measurement item. Also, the first reasoner 711 sets a flag as appropriate if the contribution has varied.

<Operation of Second Reasoner>

Figure 5:
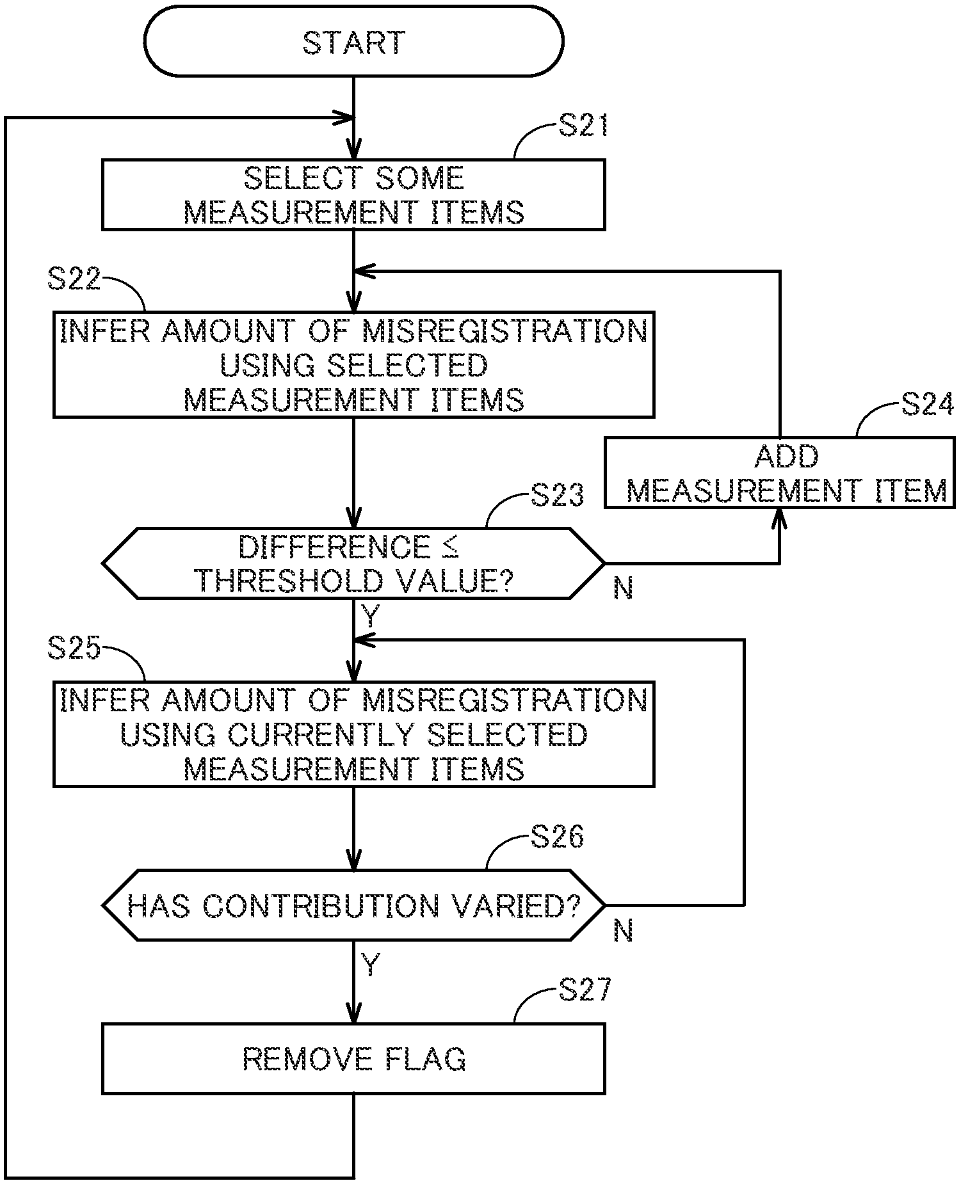
FIG. 5 is a diagram showing processes that a second reasoner executes.

FIG. 5 is a diagram showing processes that the second reasoner 712 executes. As shown in FIG. 5, the second reasoner 712 repeatedly executes a selection process S21 through a determination process S26 while printing is being performed in the image formation apparatus 1.

First, the second reasoner 712 selects some measurement items from all measurement items (the selection process S21). Some measurement items selected by the second reasoner 712 are used when the second reasoner 712 infers the amount of misregistration. The second reasoner 712, for example, selects the first to nth measurement items (where n is a natural number smaller than m) in order of contribution from all m measurement items (where m is a natural number).

Upon selecting some measurement items according to the selection process S21, the second reasoner 712 uses the measurement data on the selected measurement items to infer the amount of misregistration (a second misregistration amount) (an inference process S22). The second reasoner 712 determines whether the difference between the amount of misregistration inferred according to the inference process S22 and the amount of misregistration (the first misregistration amount) inferred according to the inference process S11 by the first reasoner 711 is greater than a predetermined threshold value or not (a determination process S23).

If the second reasoner 712 determines that the difference is greater than the threshold value according to the determination process S23, the second reasoner 712 adds another measurement item to the currently selected measurement items (an addition process S24). In the addition process S24, the second reasoner 712 selects a measurement item to be added, based on the contribution calculated according to the calculation process S12 by the first reasoner 711. As an example, the second reasoner 712 adds a measurement item with the greatest contribution of the currently unselected measurement items in the addition process S24. Upon completion of the addition process S24, the second reasoner 712 executes the inference process S22 again.

In this manner, the second reasoner 712 repeatedly executes the inference process S22 through the addition process S24 until the aforementioned difference in the amount of misregistration is not greater than the predetermined threshold value. This allows the second reasoner 712 to select some measurement items suitable for the inference of the amount of misregistration from all measurement items.

The second reasoner 712 may perform a replacement process for replacing some of the selected measurement items with some other measurement items in accordance with a predetermined rule in place of the addition process S24. Then, the second reasoner 712 may use the measurement data on some measurement items selected after the replacement to infer the amount of misregistration in an inference process S25. Also, the second reasoner 712 may perform both the addition process S24 and the aforementioned replacement process. Further, the second reasoner 712 may perform the addition process S24 and the aforementioned replacement process in an alternating manner.

If the second reasoner 712 determines that the difference in the amount of misregistration is not greater than the threshold value according to the determination process S23, the second reasoner 712 uses the measurement data on the currently selected measurement items to infer the amount of misregistration (the inference process S25). The aforementioned ejection controller 713 determines the timing of ink ejection from the nozzles 250 of the ejection heads 21 to 24 so as to cancel out the amount of misregistration inferred according to the inference process S25 by the second reasoner 712. This suppresses the occurrence of misregistration between images formed by the ejection heads 21 to 24.

After the inference process S25, the second reasoner 712 determines whether the contribution has varied or not (the determination process S26). Specifically, in the determination process S26, the second reasoner 712 determines whether a flag according to the flag process S14 (FIG. 4) is up or not. If the second reasoner 712 determines that the flag is up according to the determination process S26, the second reasoner 712 removes the flag (a flag removal process S27). After the removal of the flag, the second reasoner 712 executes the selection process S21 again.

If the second reasoner 712 determines that the flag is not up according to the determination process S26, the second reasoner 712 executes the inference process S25 again. Thus, if the contribution has not varied, the second reasoner 712 periodically repeatedly performs the inference of the amount of misregistration.

In this manner, if the contribution has varied, some measurement items are selected again from all measurement items, based on the varied contribution. This allows the accuracy of the inference of the amount of misregistration to be maintained at a high level.

The first reasoner 711 uses the measurement data on all measurement items to infer the amount of misregistration. In this case, although the amount of misregistration is inferred with high accuracy, the amount of inference computation becomes large. On the other hand, the second reasoner 712 uses the measurement data on some measurement items out of all measurement items to infer the amount of misregistration. This allows the amount of computation performed by the second reasoner 712 to be smaller than the amount of computation performed by the first reasoner 711. Thus, the time required for the inference of the amount of misregistration is reduced. Also, some measurement items are selected based on the contribution of each measurement item to the amount of misregistration inferred by the first reasoner 711. This allows the amount of misregistration to be inferred with accuracy even if the measurement data on some measurement items is used.

2. Modifications

While the embodiment according to the present invention has been described hereinabove, the present invention is not limited to the aforementioned embodiment, but various modifications may be made.

The measurement items measured by the measurement part 30 are not limited to those mentioned above. For example, the measurement part 30 may include a temperature sensor for detecting the temperature inside and outside the image formation apparatus 1 and a humidity sensor for detecting the humidity inside and outside the image formation apparatus 1. The temperature and the humidity may be included in the measurement items.

While the invention has been described in detail, the foregoing description is in all aspects illustrative, and the invention is not limited thereto. It is therefore understood that numerous modifications and variations not illustrated can be devised without departing from the scope of the invention. The components described in the aforementioned embodiment and in the various modifications may be combined together or dispensed with, as appropriate, unless the components are inconsistent with each other.

REFERENCE SIGNS LIST

1 Image formation apparatus
9 Printing paper
10 Transport mechanism
20 Image recording part
21, 22 Ejection heads
23, 24 Ejection heads
30 Measurement part
31 Torque detection parts
33 Edge position detection parts
35 Encoders
37 Tension detection parts
70 Controller
711 First reasoner
712 Second reasoner
713 Ejection controller

The invention claimed is:

1. An image formation apparatus comprising:

a transport mechanism for transporting an elongated strip-shaped base material along a predetermined transport path in a longitudinal direction of said base material;

a first ejection part for ejecting a first ink toward said base material being transported by said transport mechanism;

a second ejection part positioned downstream from said first ejection part and for ejecting a second ink toward said base material being transported by said transport mechanism;

a measurement part for acquiring measurement data for each of a plurality of measurement items about a state of said base material;

a first reasoner for inferring the amount of misregistration between a first image formed by said first ejection part and a second image formed by said second ejection part, based on the measurement data on said plurality of measurement items; and a second reasoner for selecting some measurement items from said plurality of measurement items, based on a contribution of each measurement item to said amount of misregistration inferred by said first reasoner, and for inferring said amount of misregistration using the measurement data on said selected measurement items.

2. The image formation apparatus according to claim 1, wherein said second reasoner selects some measurement items from said plurality of measurement items so that an error between said amount of misregistration inferred by said first reasoner and said amount of misregistration inferred by said second reasoner is not greater than a predetermined threshold value.

3. The image formation apparatus according to claim 1, wherein said second reasoner selects some measurement items from said plurality of measurement items again in accordance with a variation in said contribution to infer said amount of misregistration using the measurement data on said measurement items selected again.

4. The image formation apparatus according to claim 1, further comprising an ejection controller for controlling the ejection of said second ink from said second ejection part, based on said amount of misregistration inferred by said second reasoner.

5. A method of forming an image comprising the steps of:

a) transporting an elongated strip-shaped base material along a predetermined transport path in a longitudinal direction of said base material;

b) ejecting a first ink toward said base material being transported according to said step a);

c) ejecting a second ink toward said base material being transported according to said step a) downstream from a position in which said first ink is ejected according to said step b);

d) acquiring measurement data for each of a plurality of measurement items about a state of said base material;

e) inferring the amount of misregistration between a first image formed on said base material according to said step b) and a second image formed on said base material according to said step c), based on the measurement data on said plurality of measurement items;

f) selecting some measurement items from said plurality of measurement items, based on a contribution of each measurement item to said amount of misregistration inferred according to said step e); and g) inferring said amount of misregistration using the measurement data on said measurement items selected according to said step f).

* * * * *